(12) United States Patent
Meldal et al.

(10) Patent No.: US 7,064,179 B1
(45) Date of Patent: Jun. 20, 2006

(54) PEG-BASED MACROMONOMERS, CHEMICALLY INERT POLYMERS PREPARED THEREFROM AND THE USE OF THESE POLYMERS FOR ORGANIC SYNTHESIS AND ENZYME REACTIONS

(75) Inventors: Morten Meldal, Frederiksberg (DK); Jens Buchardt, Copenhagen (DK); Joerg Rademann, Copenhagen (DK)

(73) Assignee: Carlsberg A/S, Valby (DK)

( * ) Notice: Subject to any disclaimer, the term of this patent is extended or adjusted under 35 U.S.C. 154(b) by 0 days.

(21) Appl. No.: 09/787,881

(22) PCT Filed: Sep. 28, 1999

(86) PCT No.: PCT/DK99/00508

§ 371 (c)(1),
(2), (4) Date: Jun. 28, 2001

(87) PCT Pub. No.: WO00/18823

PCT Pub. Date: Apr. 6, 2000

(30) Foreign Application Priority Data

Sep. 28, 1998  (DK) ................................. 1998 01224

(51) Int. Cl.
*C07D 305/00* (2006.01)
*C08G 65/34* (2006.01)
(52) U.S. Cl. ...................... 528/425; 549/510
(58) Field of Classification Search ................ 549/510, 549/511; 528/425
See application file for complete search history.

(56) References Cited

U.S. PATENT DOCUMENTS

| 4,774,356 A | 9/1988 | Inoue et al. ................. 560/224 |
| 5,352,756 A | 10/1994 | Meldal ......................... 525/50 |
| 5,573,934 A | 11/1996 | Hubbell et al. ............. 435/177 |

FOREIGN PATENT DOCUMENTS

| DE | 1911328 | * | 3/1969 |
| EP | 0 415 404 | | 3/1991 |
| WO | 91/15952 | | 10/1991 |
| WO | 97/42242 | | 11/1997 |
| WO | 99/29759 | | 6/1999 |

OTHER PUBLICATIONS

Gnanou, Yves et al., "Macromonomer synthesis. New functionalization methods", *Makramol. Chem.*, 188, pp. 2111-2119, (1987).
Buchardt, Jens et al., Chemical Abstracts, vol. 130, No. 8, "A chemically inert hydrophilic resin for solid phase organic synthesis", 1 page, (Feb. 22, 1999).
Kawaguchi, Seigou et al., Chemical Abstracts, vol. 121, No. 8, "Fluorescence Probe Study of Micelle Formation of Poly(ethylene oxide) Macromonomers in Water", 1 page, (Aug. 22, 1994).
Nomura, Eiji et al., Chemical Abstracts, vol. 126, No. 22, "Radical Polymerization Kinetics of Poly(ethyleneoxide) Macromonomers", 1 page, (Jun. 2, 1997).
Rademann, Joerg et al., Chemical Abstracts, "SPOCC: A Resin form Solid-Phase Organic Chemistry and Enzymatic Reactions on Solid Phase" retrieved from STN, 1 page, (1999).
Ogawa, Ryutaro et al., Chemical Abstracts, "Graft polymer—used as functional polymers, biological polymers and in medical products", 1 page, (1997).

* cited by examiner

*Primary Examiner*—D. Margaret Seaman
*Assistant Examiner*—Niloofar Rahmani
(74) *Attorney, Agent, or Firm*—Foley & Lardner LLP

(57) ABSTRACT

The present invention relates to macromonomers containing ethylene glycol repeat units, to chemically inert polymers prepared therefrom and to the use of such polymers in solid phase biochemical assays. A macromonomer of polyethylene glycol having repeat units in the range 6–300 and having at least one end terminated by an ether group having formula (I) where m is an integer of 0–10, a is an integer of 1–4, and R is H or alkyl or aryl or arylalkyl; or having formula (II) where m is an integer of 1–10, and R is H or alkyl or aryl or arylalkyl

17 Claims, 9 Drawing Sheets

Before enzyme addition

1 h enzyme reaction

PEG-BASED MACROMONOMERS, CHEMICALLY INERT POLYMERS PREPARED THEREFROM AND THE USE OF THESE POLYMERS FOR ORGANIC SYNTHESIS AND ENZYME REACTIONS

FIELD OF THE INVENTION

The present invention relates to macromonomers containing ethylene glycol repeat units, to chemically inert polymers prepared therefrom and to the use of such polymers in solid phase biochemical assays.

BACKGROUND OF THE INVENTION

The use of acrylamide terminated polyethylene glycol in the preparation of cross-linked polymers has been described in International Patent Application No. WO 93/16118 and UK 9609911.4. Such polymers have a particular use as solid supports for the synthesis of peptides, oligonucleotides or oligosaccharides or as substrates for the immobilisation of proteins or as chromatographic resins. They are completely swelled in water and can also used for solid phase enzyme assays. Whilst the polymers so produced were particularly useful as supports for polypeptide synthesis the elimination of the labile bonds in the backbone of the polymer matrix and replacement with more chemically inert bonds allow them to be used as supports for carrying out a large diversity of organic reactions.

Whereas all previously described PEG-based resins are quite labile to harsh and generally used reaction conditions such as acetic anhydride and Lewis acid, thionyl chloride, butyllithium or potassium hexamethyldisilazan, a polymer containing only stable primary ether bonds in addition to CH and CC bonds would be completely stable under those conditions.

With the above requirements in mind we have now developed a series of macromonomers of oxethane or vinylphenylpropyl ether terminated polyethylene and polypropylene glycols from which cross-linked resins may be prepared in which the labile bonds in previously described PEG-based polymers are replaced by stable ether linkages whilst retaining the optimised balance of hydrophilic-hydrophobic character.

SUMMARY OF THE INVENTION

In one aspect the present invention concerns a macromonomer of polyethylene glycol having repeat units in the range 6–200 and having at least one end terminated by an ether group having the formula:

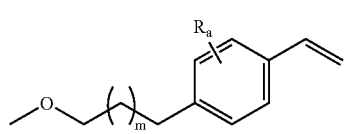

where m is an integer of 0–10, a is an integer of 1–4, and R is H or alkyl or aryl or arylalkyl;

or having the formula

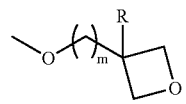

where m is an integer of 1–10, and
R is H or alkyl or aryl or arylalkyl.

In another aspect the present invention concerns a macromonomer of type A having the structure:

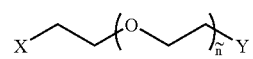

where ñ is a real number of 6–300, and ñ also means the average value of n in the following, and where X and Y each independently is a group of the formula

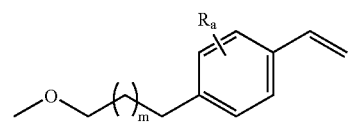

where m is an integer of 0–10, and R is H or alkyl or aryl or arylalkyl, or where X is —OH, and Y is a group of the formula

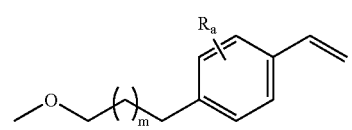

where m is 0–10, a is as defined above, and R is H or alkyl or aryl or arylalkyl, or where X and Y each independently are a group of the formula

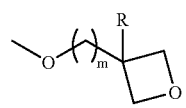

where m is 1–10, and R is H or alkyl or aryl or arylalkyl, or where X is —OH, and Y is a group of the formula

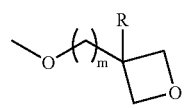

where m is 1–10, and R is H or alkyl or aryl or arylalkyl.

In a further aspect the present invention concerns a macromonomer of type B having the structure:

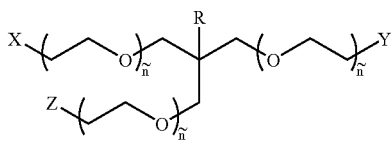

where R is H or alkyl or aryl or arylalkyl,
and ñ is a real number of 6–300 as defined above
and where X, Y and Z each independently is OH or a group of the formula

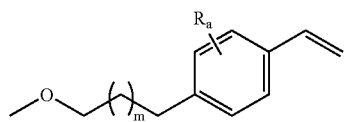

where m is an integer of 0–10, a is as defined above, and R is H or alkyl or aryl or arylalkyl,
provided that at least one of X, Y or Z is a group of the formula

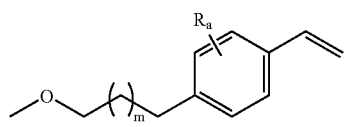

where m is an integer of 0–10, a is as defined above, and R is H or alkyl or aryl or arylalkyl,
or where X, Y and Z each independently is are OH or a group of the formula

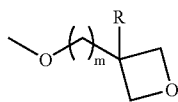

where m is an integer of 1–10, a is as defined above, and R is H or alkyl or aryl or arylalkyl,
provided that at least one of X, Y or Z is a group of the formula

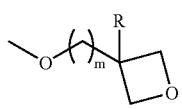

where m is an integer of 1–10, a is as defined above, and R is H or alkyl or aryl or arylalkyl.

DETAILED DESCRIPTION OF THE INVENTION

In the present context, the term "alkyl" designates a 1–10 carbon atom aliphatic residue such as methyl, ethyl, propyl, isopropyl, butyl, isobutyl, sec.butyl, tert.butyl, pentyl, hexyl, heptyl, octyl, nonyl or decyl. The term "arylalkyl" designates an aryl group linked to a 1–5 carbon atom alkylene chain such as methylene, ethylene or propylene, and the aryl group therein may be of the of the monocyclic or dicyclic aromatic type including normal carbocyclic aromatic types such as phenyl, naphtyl and biphenyl, as well as heterocyclic types such as pyridyl, bipyridyl, imidazolyl, triazolyl, pyrrolyl, bipyrrolyl, thiazolyl and oxazolyl.

The factor "a" as applied to the substituent R indicates that R is present of the phenyl ring a total of "a" times, and that each group R can be selected from the definition of R independently of the other groups R.

The factor "ñ" is as defined above a real number of 6–300 and designates the average number of the ethyleneoxy group in question present in the macromonomer.

The macromonomers of the invention may conveniently be prepared by reacting an alkali metal derivative, such as a lithium, sodium, potassium or cesium derivative, of the appropriate polyethylene glycol, preferably the sodium derivative, with the appropriate halo substituted, e.g. bromo, chloro or iodo substituted, or arylsulfonate substituted, such as tosyl substituted, vinylphenylalkyl or oxetanylalkyl derivative to yield the corresponding vinylphenylalkyl or oxetanylalkyl capped polyethylene glycol.

The polyethylene glycol may be of the "star" type provided by from tetra to hexa-branching of the macromonomer from e.g. an aromatic or aliphatic carbon atom nucleus substituted with the PEG chains, or of the "T" shaped type where the PEG macromonomer is tri-branched from a tertiary or a quarternary carbon atom The alkali metal derivative of polyethylene glycol with Li, Na, K or Cs may be formed by reaction with an alkali metal such as sodium, potassium, lithium or an alkali metal hydride e.g. NaH, KH, LiH or by exchange with alkyl- or alkoxy- or other alkali metal alts e.g. BuLi, KOtBu, Cs$_2$CO$_3$ KHMDS.

The capped vinylphenylalkyl macromonomers may be polymerised by use of a free-radical initiator, such as an inorganic or organic peroxide, f.x. ammonium persulfate or t-butylperoxide or metacloroperbenzoic acid or AIBN, to yield a cross-linked resin. Similarly, the oxetanylalkyl capped macromonomers may be polymerised by the use of a cationic catalyst such as for exampel Et$_2$O:BF$_3$, TMSOTf, TfOH, TMSBr, TMSI, TiCl$_4$ or ZnBr$_2$ salts or halides and other salts of hafnium, yttrium, tantal and iron to yield a cross-linked resin.

In yet a further aspect, the invention concerns a cross-linked polymer formed by the bulk polymerisation of the products of the reaction between mono- and di- alkali metal derivatives of polyethylene glycol with a vinylphenylalkyl derivative having the formula:

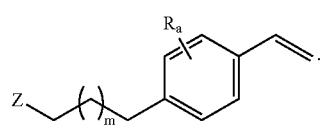

where Z is Cl, Br, I, toluenesulfonyloxy CH$_3$SO$_3$ or CF$_3$SO$_3$
a is an integer of 1–4, and m is an integer of 0–10, and R is H or alkyl or aryl or arylalkyl.

The synthesis of a compound of this class may for example be achieved in the following way:

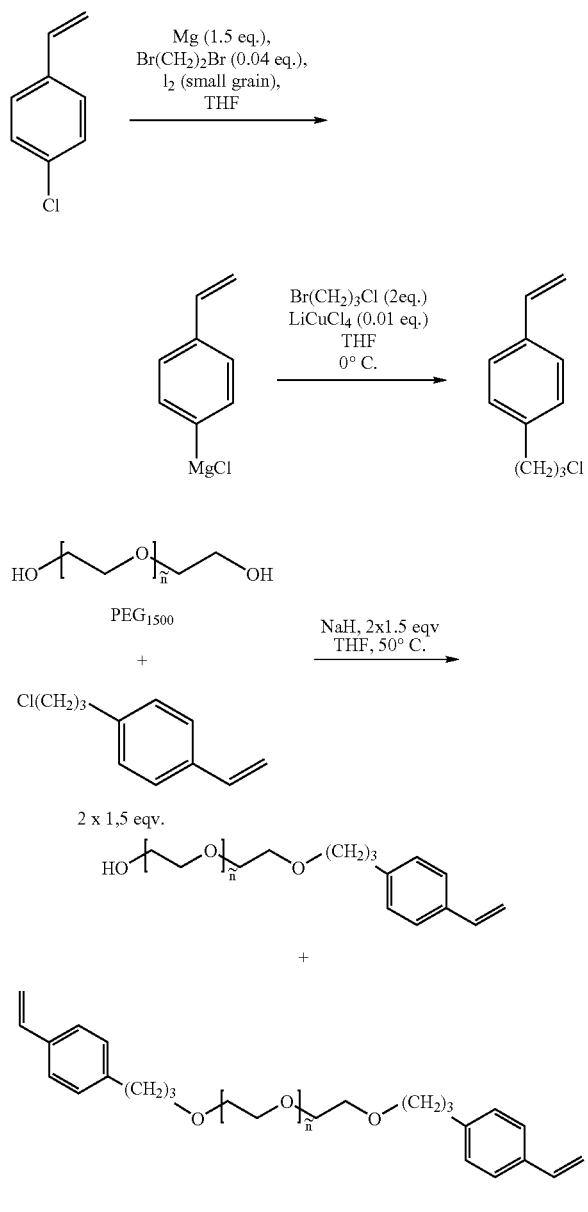

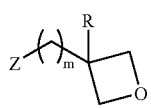

In yet a further aspect the invention concerns a cross-linked polymer formed by the bulk polymerisation of the products of the reaction between mono- and di- alkali derivatives of polyethylene glycol with an oxetane or oxetanylalkyl derivative having the formula:

where Z is Cl, Br, I, toluenesulfonyloxy, $CH_3SO_3$ or $CF_3SO_3$, m is an integer of 1–10, and R is H or alkyl or aryl or arylalkyl.

Members of this compound class may for example be prepared in the following manner:

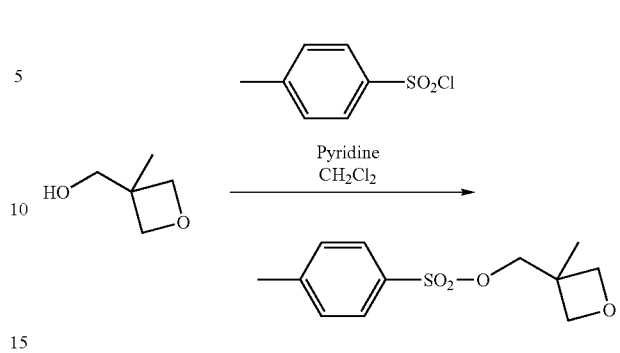

In the drawings,

The oxethan derived polymer may be prepared in a beaded form neat or by dissolving the oxetanylated macromonomer in a volume of a solvent (e.g. acetonitrile) and suspending the mixture in silicon oil in the presence of a surfactant, typically a polymer obtained from radical polymerization of methacryloxypropylpentamethyldisiloxane and methacryloyl PEG 350 monomethylether. The Lewis acid $BF_3$ is added at low temperature just before suspension in the oil.

The polymer may be modified by a temporary crosslinker which is selectively cleaved at a later point in time to give a more expandable polymer. This is typically achieved by incorporation of (bis-(3-methyl-3-oxetanylmethoxy)-2-buten and later the doublebond is cleaved by ozonoiysis or ruthenium catalyzed methatesis reaction using an excess of ethylene.

Figure 1:
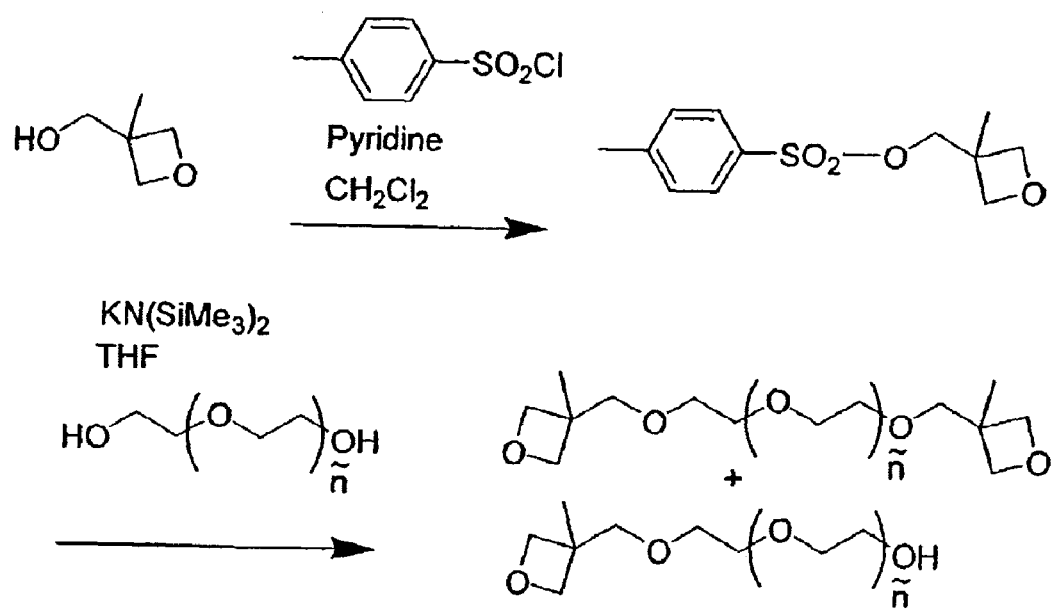
FIG. 1 is a schematic representation of the reactions involved in the preparation of vinylphenylalkyl ether capped polyethylene glycol and oxetane capped polyethylene glycol macromonomers.
Figure 2:
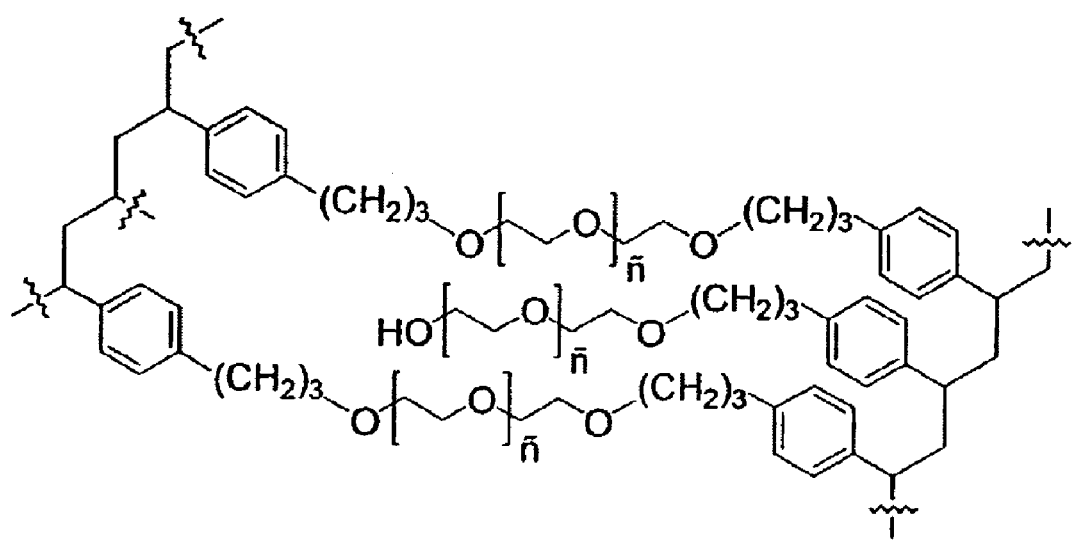
FIG. 2 is a representation of the cross-linked resin obtained by polymerisation of vinylphenylalkyl ether capped polyethylene glycol.
Figure 3:
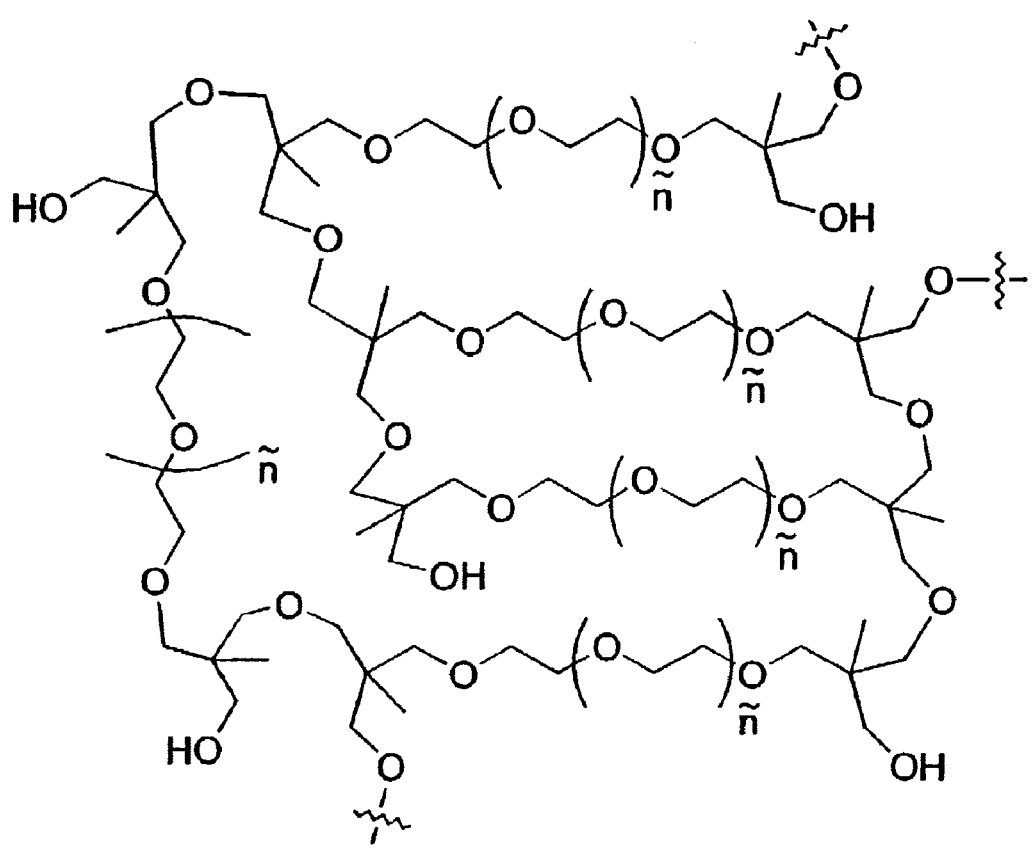
FIG. 3 is a representation of the resin obtained by the polymerisation of oxetane capped polyethylene glycol.
Figure 4:
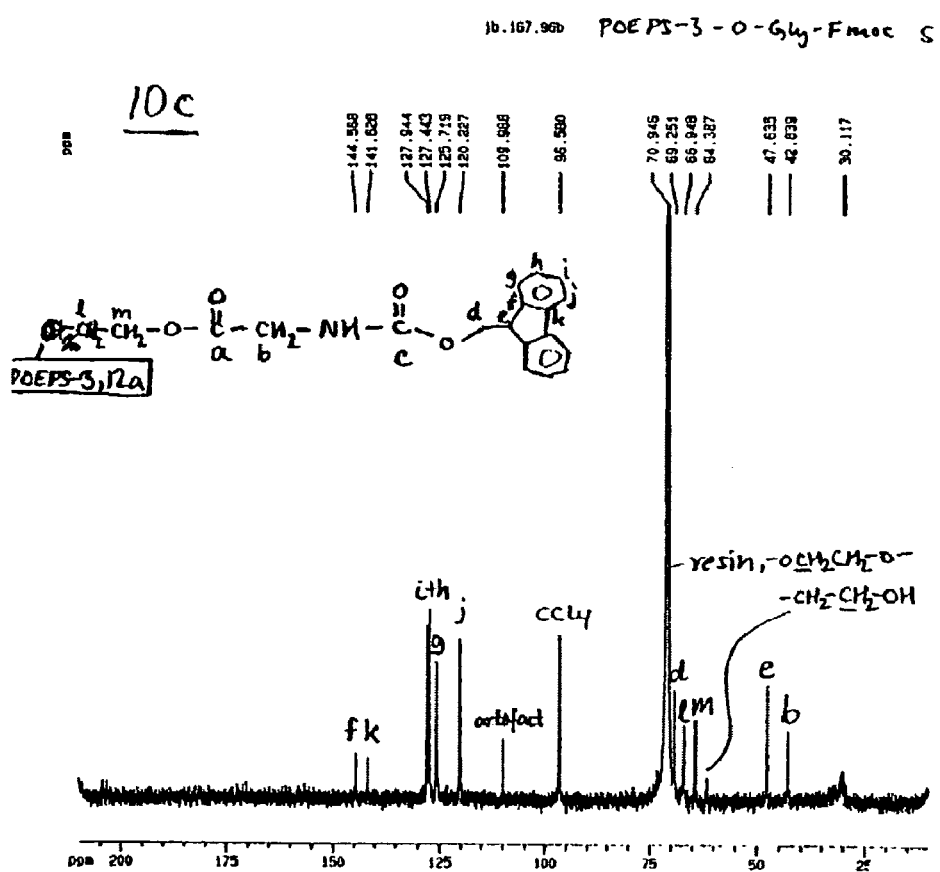
FIG. 4 is a gel phase $^{13}C$ NMR trace of the cross-linked polymer of FIG. 2 derivatized by Fmoc-Gly.
Figure 5:
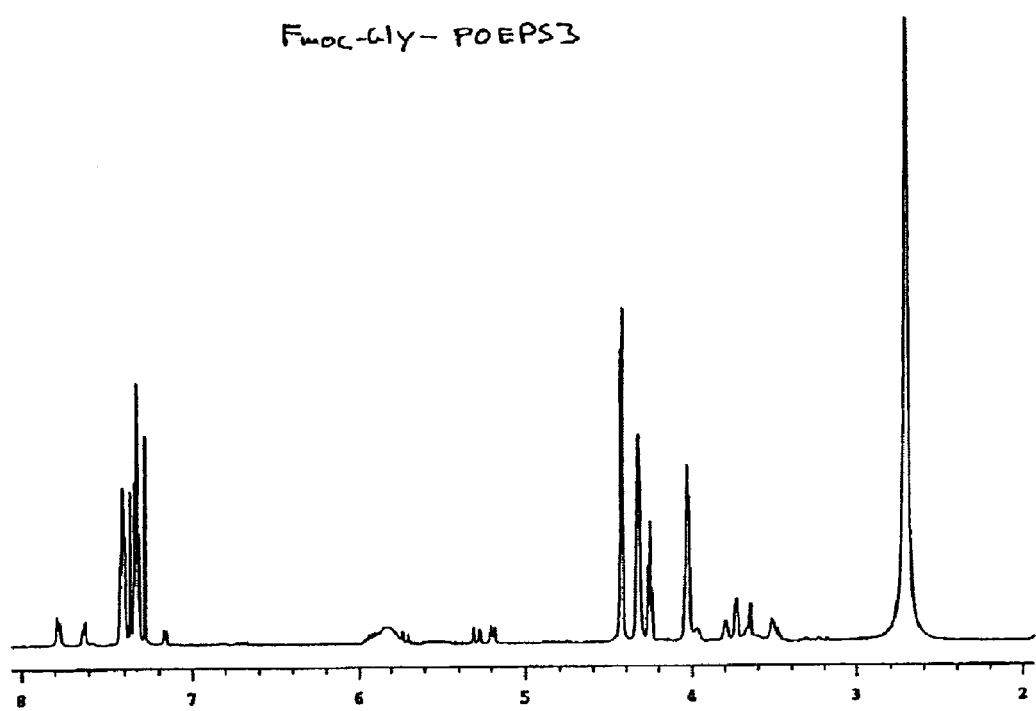
FIG. 5 is a magic angle spinning solid phase $^1H$-NMR trace with selective irradiation at 3.67 ppm to suppress the PEG signal of the cross-linked polymer of FIG. 2 after acylation with Fmoc-Gly. Resolved spectra were obtained and similar results were obtained with the resin in FIG. 3 in MAS solid phase $^1H$-NMR spectroscopy.
Figure 6:
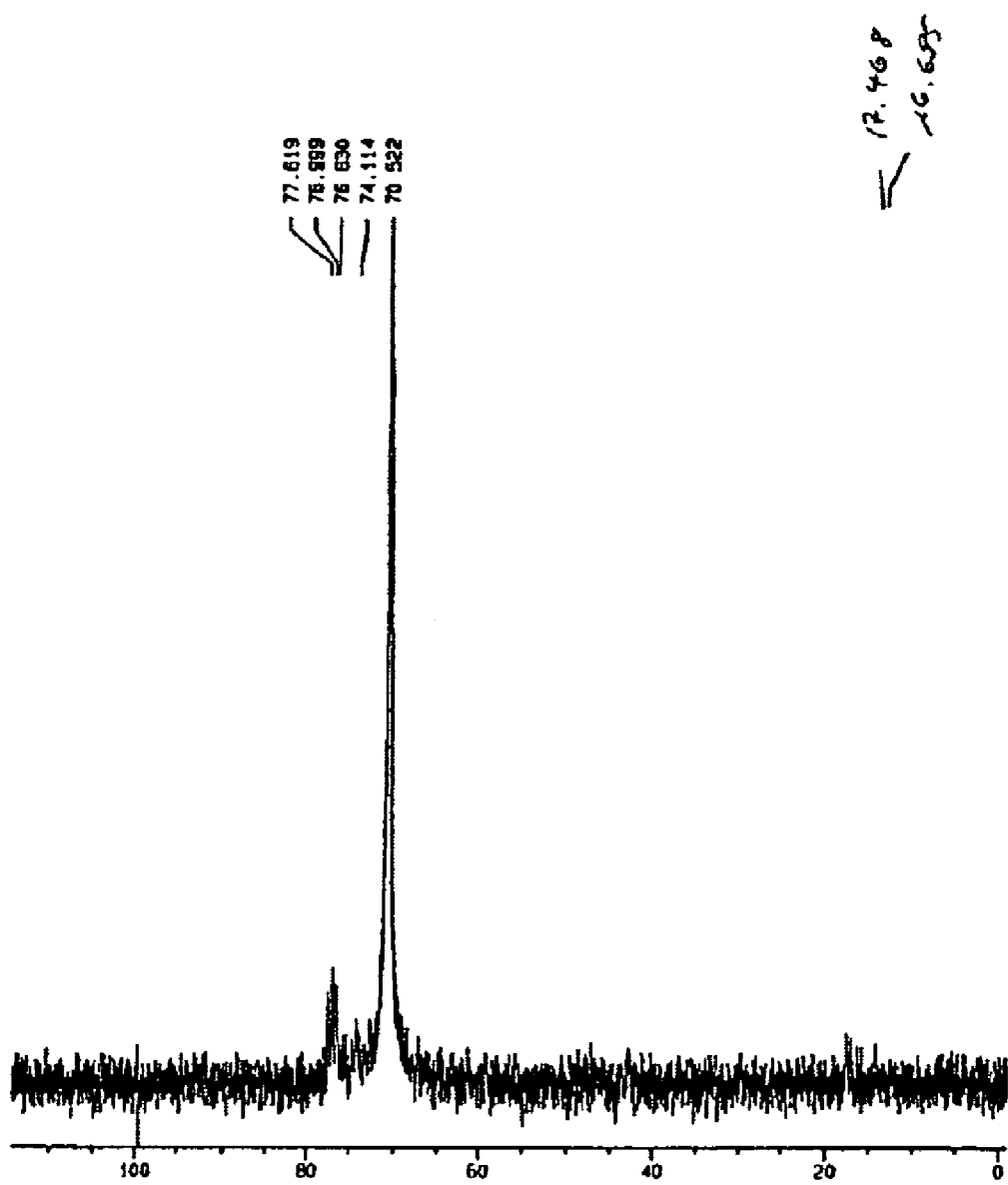
FIG. 6 is a gel phase $^{13}C$-NMR trace of the cross-linked polymer of FIG. 3.
Figure 7:
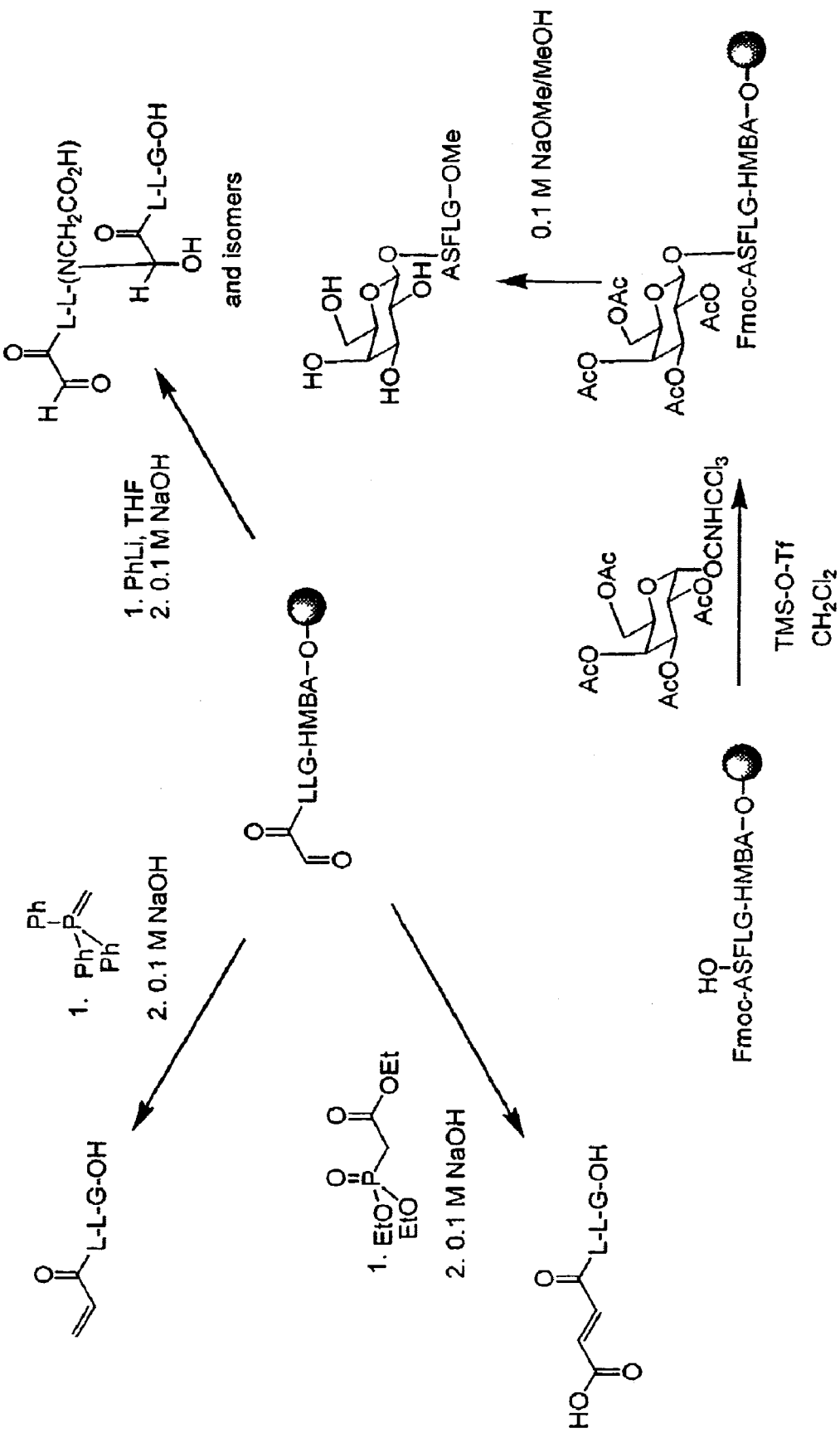
FIG. 7 Shows organic reactions which have been successful on resin prepared by polymerization of 3-methyloxetan-3-ylmethyl derivatised macromonomers.
Figure 8:
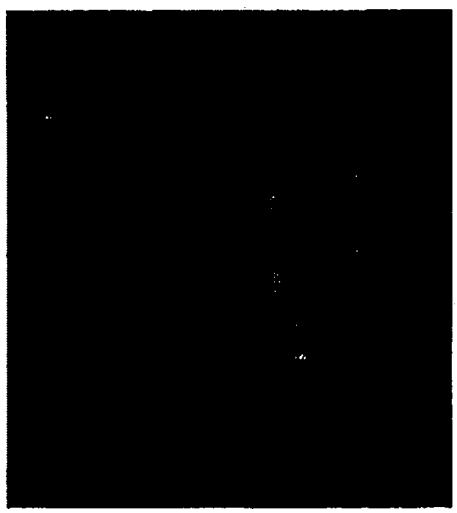
FIG. 8 Illustrates a solid phase enzyme assay in which a fluorescence quenched substrate bound to a resin prepared from vinylphenylpropyl-PEG macromonomers is cleaved for 1 h by subtilisin Carlsberg migrating through the polymer network. The same result was obtained with the SPOCC polymer.
Figure 8:
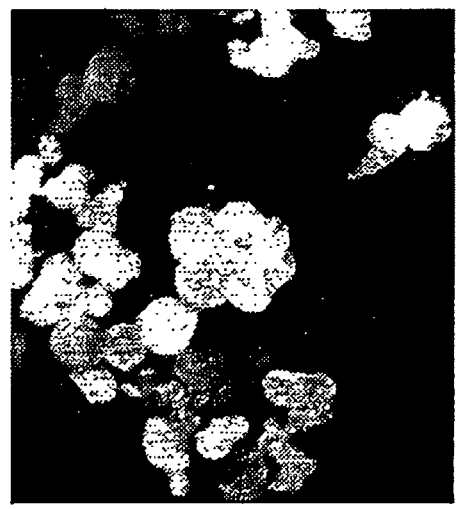
Figure 9:
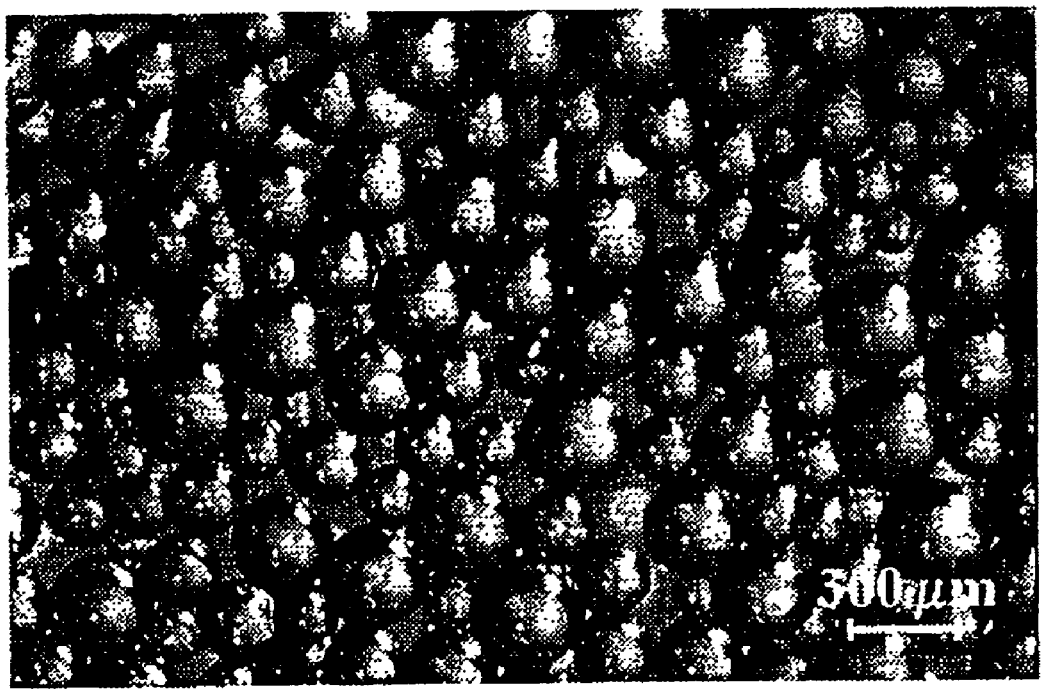
FIG. 9 Shows a beaded SPOCC resin obtained by polymerisation in silicon oil.

The following examples illustrate the present invention.

EXAMPLE 1

3-Methyl-3-(4-toluenesulfonoxymethyl)-oxetane. 4-Toluene sulfonyl chloride (20 g, 105 mmol) was dissolved in $CH_2Cl_2$ (50 mL) and pyridine (50 mL). Under cooling in an ice bath, 3-hydroxymethyl-3-methyl-oxetane (100 mmol, 9.9 mL) was added dropwise. The reaction was warmed to room temperature over night. It was diluted with $CH_2Cl_2$ (100 mL) and extracted with water. The organic phase was dried with magnesium sulfate filtered and solvents were removed by evaporation. The remainders were coevaporated several times with toluene to remove the remaining pyridine and with chloroform to remove the toluene. The obtained crude product was of sufficient purity for further use. Yield: 22 g of a white crystalline solid (92%). TLC: Rf (petroleum ether/ethyl acetate 1:1): 0.56. The spectroscopic data were in accordance with literature (Dale, J.; Fredriksen, S. B. *Act. Chem. Scand. B* 1992, 46, 271–277).

EXAMPLE 2

Bis-oxytanylated polyethylene glycol
(bis-(3-methyl-3-oxetanylmethoxy)-PEG

Polyethylene glycol (–400 or –1500; 10 mmol) was dried carefully by coevaporation of water with toluene. Then it was dissolved in toluene and DMF (each 15 mL). Under stirring potassium hexamethyldisilazan (KHMDS) (22 mmol) was added at room temperature, after 15 min the solvents were removed together with HMDS at 50° C. waterbath with the rotary evaporator. The remaining potassiated PEG was redissolved in DMF (15 mL). The tosylated oxetane derivative (24 mmol) was added in portions at room temperature and the reaction was heated for 12 hrs to 75° C. After cooling to ambient temperature water (2 mL) was added and stirred for 15 min in order to fully hydrolyze unreacted alkylating agent. The solvents were removed at 40° C. under reduced pressure. The remaining slurry was resuspended in $CH_2Cl_2$ and filtered through a layer of kieselguhr (Celite) (2 cm of kieselguhr on a glass filter, wetted with organic solvent and compressed) and finally evaporated to dryness. Yield: 90% of 2a. The NMR of the acetylated product indicated the alkylation of >95% of the PEG-hydroxy groups with oxetane rings.

When reduced excess of the alkylating reagents 3 was employed (15 and 18 mmol) the percentage of oxetanyl group was decreased (66%, 80%).

EXAMPLE 3

Acetylation of Mixtures of Mono- and
Bis-Oxytanylated PEG

Reaction mixture from Example 2 (10 g) was dissolved in pyridine (20 mL). Acetic anhydride (10 mL) was added and the reaction was stirred at room temperature for 24 h. Solvents were removed under reduced pressure and the degree of acetylation was quantified by $^1$H-NMR.

EXAMPLE 4

SPOCC-Resin Formed by Polymerization of
Oxetanylated PEG

Procedure A.: Oxetanylated PEG-1500 or -400 (1 to 20 mmol) prepared as in Example 2 or the acetylated derivative from Example 3 was dissolved under argon in an equal volume of $CH_2Cl_2$, cooled to –20° C., and stirred with a magnetic stirrbar. Boron trifluoride diethyletherate (0.15 to 0.3 equiv.) was added. Warming was conducted gradually in order to determine the temperature at which polymerization occurs (–10° C., 2 h; 0° C., 2 h; 4° C., 2 h). Finally, the viscosity of the solution increased and magnetic stirring stopped (sticky point). The sticky point was reached after the solution was kept at 4° C. for 30 min. The polymer was stored at this temperature (2 d) and an additional day at room temperature. For work-up the polymer was cut into pieces. These were swollen ($CH_2Cl_2$, 2 h) and then granulated through a metal sieve (1 mm pore size) employing a pestle. The granulated resin was washed carefully ($CH_2Cl_2$, THF, DMF, water, DMF, THF, $CH_2Cl_2$) and dried in vacuo. Resin loading and the swelling volumes in different solvents were determined. The hydroxyl group capacity of the polymers was determined by esterification with fluorenylmethyloxycarbonyl (Fmoc)-Gly using the MSNT method (Tetrahedron Letters 1988, 29, 5871–5874) and measuring the UV-absorbence of the adduct of dibenzofulvene and piperidine formed by treatment of a weighted polymer sample with 20% piperidine/DMF. 0.6

The swelling capacity of the polymer product was determined by the syringe method (Azanneau, F. I., et al. *J. Peptide Sci.*, 1995, 1, 31–44). The swelling volumes of the polymer was 11 mL/g in DMF; 12 mL/g in methylene dichloride and 14 mL/g in water respectively.

EXAMPLE 5

SPOCC-Resin formed by polymerization of oxetanylated PEG. Procedure B.: Oxetanylated PEG-1500 from Example 3 was dissolved in $CH_2Cl_2$ (1 mL/g monomer) and cooled to 0° C. Lewis acid catalyst $BF_3OEt_2$ was added (0.4 eq.). It was warmed to room temperature and the sticky point was reached after 10 min, as indicated by increased viscosity halting the magnetic stirrer. After stirring stopped the reaction was warmed to 60° C. for 2 d. After cooling to room temperature work-up was conducted as described under procedure A.

EXAMPLE 6

SPOCC-Resin Formed by Polymerization of
Oxetanylated PEG

Procedure C.: Oxytanylated PEG-400 from Example 2 was dissolved in diglyme (1 mL/g monomer) and stirred at room temperature. $BF_3OEt_2$ was added slowly and stirring stopped after 1 min. The reaction was warmed to 70° for two d. After cooling to room temperature work-up was conducted as described under procedure A.

Loadings and swelling obtained with resins prepared in Examples 4–6 are presented in table 1 and it is clear that the best polymerization is obtained with acetylated macromonomers.

TABLE 1

| PEG Length | Oxetane (%) | —OR | Protocol | loading | swelling: $H_2O$ | DMF | $CH_2Cl_2$ |
|---|---|---|---|---|---|---|---|
| 400 | >95 | —H | A | 0.6 | | | |
| 400 | >95 | —Ac | B | 0.4 | 2.6 | 2.3 | 3.3 |
| 400 | 70 | —Ac | B | 1.2 | | | |
| 1500 | >95 | —H | A | 0.4 | 43 | 37 | 54 |
| 1500 | >95 | —Ac | C | 0.3 | 10 | 8 | 13.5 |

EXAMPLE 7

Bis-vinylphenylpropyl-polyethylene glycol(1500)

Anhydrous (Harris, J. M. *J. Macromol. Sci., Rev. Macromol. Chem. Phys.* 1985;C25:325–373.) $PEG_{1500}$ (12.4 g) was dissolved in THF (25 mL) under Ar at 50° C. and NaH (497 mg, 60% in oil, 1.5 eq.) was added. After 5 min. Vinylphenylpropylchloride (2.2 mL, 1.5 eq.) was added over a period of 15 min. Addition of NaH/vinylphenylpropylchloride (1.5 eq. each) was repeated after 3 h and again NaH (1.5 eq.) was added after 6 h. The brown mixture was stirred for another 16 h, concentrated, dissolved in water (75 mL), neutralized, water (125 mL was added and the solution washed with light petroleum (50 mL). Concentration of the water phase and subsequent coevaporation with toluene (3×35 mL) gave a brown, opaque residue which was dissolved in $CH_2Cl_2$ (150 mL) and dried with $MgSO_4$ (35 g). Filtration through Celite and concentration to dryness yielded 13.1 g light brown solid (94%), pure according to proton NMR.

EXAMPLE 8

Polymerisation of bis-vinylphenylpropyl-polyethylene glycol (1500)

Resin from vinylphenylpropyl substitutet PEG (1500) synthesized in Example 7 was prepared in beaded form by inverse supension polymerisation of the vinylphenylpropyl substitutet PEG (1500) (12.6 g) at 70° C. for 2.5 h using $(NH_4)_2S_2O_8$ (148 mg, 0.07 eq.), tetramethyl ethylenediamine (443 µL, 0.32 eq), sorbitan monolaurate (133 mg) and a polymerization procedure described previously. (Auzanneau, F.-I.; Meldal, M., and Bock, K., J. Pept. Sci., 1995, 1, 31–44.) 120 g carbon tetrachloride and 80 g n-heptane were mixed in a polymerizer and purged with nitrogen for twenty minutes and warmed to 70° C. A solution of the product from Example 7 (12.6 g) in 30 g water together with 0.148 g $K_2S_2O_8$ was purged with nitrogen and poured into the organic phase and stirred at 650 rpm. After 2 min tetramethylethylene dianine (443 µL, 0.32 eq.) was added. Polymerisation was allowed to proceed for five hours at 70° C. at the end of which time the reaction mixture was filtered, the beads washed with methanol and dried under vacuum. The dried particles were sized at 70–400 µm in diameter. Yield: 65%.

EXAMPLE 9

Polymerisation of bis-vinylphenylpropyl-polyethylene glycol(1500)

Alternatively the resins were prepared by bulk polymerisation in water at r.t. for 24 h using $(NH_4)_2S_2O_8$ (0.06 eq.) and tetramethyl ethylenediamine (0.25 eq.) followed by granulation, sieving, washing and lyophilization. Yields: 71%. The loading and swelling was determined as described in Example 4: Loading: 0.22 mmol/g. Swelling: 4 mL/g (DMF), 4 mL/g ($H_2O$), 6 mL/g ($CH_2Cl_2$)

EXAMPLE 10

The macromonomers of the present invention can be co-polymerised with other monomers to vary the properties in the final polymer. The products from Example 7 can be co-polymerised with many monomers capable of free radical polymerisation, for example styrene, divinylbenzene, methacrylates, acrylates and acrylamides. However, co-monomers for the macronomomer products of Example 7 are restricted to oxetane-containing monomers.

EXAMPLE 11

Macropolymers of the type produced by the polymerisation of the macromonomers of Examples 2–3 and 7 are both expected to be chemically stable and inert, but to have different respective physical properties. For example under hydrogeneolitic, strongly basic or strongly acidic conditions both resins are fully stable. They have, however different preference for solvents of swelling. In contrast to previously reported PEG-based resins, the resins of the present invention are stable for extented periods of time to thionylchloride, 6 N HCl, TMS-Br, TMS-OTf and $Ac_2O$, conc KOH, KHDMS/$CH_2Cl_2$ and 3 mM BuLi.

The main advantages of the polymers obtained from macromonomers of the present invention are the lack of functional groups such as amides in the polymer backbone, high capacity, optimum hydrophilic/hydrophobic balance and high mechanical and in particular chemical stability. The polymers are cost-effective as they are readily prepared using available low-cost bio-compatible polyethylene glycols. The hydroxyl groups of the polymers are amenable to a wide range of functional group transformations without effecting the polymer backbone. The macropolymer resins have an open structure that allow enzymes to penetrate into the interior of the polymer network under aqueous conditions. In addition to their excellent synthesis properties they are therefore suited for performing solid phase enzyme assays using fluorescence quenched substrates or a combination of fluorescence quenched substrates and inhibitors both attached to the polymer. In particular the resin can be used in combinatorial organic synthesis of substrates and inhibitors by the split and combine method, followed by solid phase high throughput screening by exposure to enzymes and inspection of reaction development. The structure of the polymers provides excellent flow properties and reagent or solvent accessibility under organic reaction conditions.

The functional group modification is illustrated in the following examples where the hydroxyl groups are converted into bromides or amino groups.

EXAMPLE 12

Bromo-SPOCC-resin

Resin from Example 4 (1 g, 0.6 mmol) was suspended in $CH_2Cl_2$ (10 mL). Triphenylphosphine (787 mg, 5 eq.) and imidazol (204 mg, 5 eq.) were added. After complete disolvation it was cooled in a water bath to 10° C. and bromine was added dropwise (155 l, 5 eq.). Subsequently the water bath was removed and it was stirred over night at room temperature. The resin was filtered and washed with DMF, water, DMF, THF, and $CH_2Cl_2$. Elemental analysis afforded a bromine content of 0.86 mmol/g resin.

EXAMPLE 13

15 Amino-SPOCC-resin

Resin from Example 4 (1 g, 0.6 mmol) was suspended in a solution of sodium azide in DMSO (390 mmol, 10 eq., 10 mL). The mixture was warmed to 60° C. for a period of 18 h. The resin was filtered and washed extensively with DMF, water and DMF. Reduction was effected employing 1,4-dithio-threitole (DTT) in combination with 1,8-diazabicyclo [5.4.0]undenc-7-ene (DBU) (10 mL of a 0.5 M solution of DTT in DMF, containing 0.1 M of DBU). The resin was filtered and washed with DMF, THF, and $CH_2Cl_2$. Resin loading was determined by spectrophotometrical measurement of Fmoc-cleavage after functionalization of a resin sample with Fmoc-succinimide (10 eq., 4 h). Measured loading: 0.44 mmol/g.

The usefulness of the polymers obtained from the macromonomers of the present invention for organic synthesis and simultaneous compatibility with aqueous conditions are illustrated in the following examples:

EXAMPLE 14 p-[-(L-Seryl-L-phenylalanyl-L-leucyl-glycylamido)-2,4-dimethoxy benzyl]-phenoxyacetylamido-SPOCC-resin SPOCC-resin (210 mg, 0.1 mmol) was functionalized with the Fmoc-protected Rink-linker. (208 mg linker, 0.4 eq) was dissolved together with TBTU (122 mg, 0.38 mmol) and N-ethylmorpholine (NEM) (83 L, 0.5 mmol) in DMF (3 mL) and after 10 min added to the resin for 3 h. After washing with DMF (5 times) the Fmoc-group was cleaved (20% piperidine in DMF, 2 and 16 min). The deprotected amine functionality was acylated with Fmoc-amino acids (3 eq. of Fmoc-Gly-OH, Fmoc-Leu-OH, Fmoc-Phe-OH, and Fmoc-Ser-OH) which were activated with TBTU (93 mg, 0.29 mmol) and NEM (66 l, 0.4 mmol) as described for the linker and also coupled for 3 h each. After final Fmoc-deprotection the product was cleaved of a resin sample (2 mg, 95% TFA, 2 h) and analyzed by HPLC and MALDI-MS. r.t.=24.0 min. MALDI-MS: Calc. (M=$C_{20}H_{31}N_5O_5$). Found (MH$^+$, MNa$^+$, MK$^+$): 422 m/z, 444 m/z, 460 m/z. The final loading was 0.36 mmol/g.

EXAMPLE 15 p-[-1N-Oxalyl-L-phenylalanyl-L-leucyl-glycylamido)-2,4-dimethoxy benzyl]-phenoxyacetylamido-SPOCC-resin The SPOCC-resin of Example 14 (200 mg, 0.072 mmol) was treated for 3 h with an aequeous solution of NaIO$_4$ (92 mg, 6 eq.) in sodium phoshate buffer (2.5 mL of 50 mmol NaH$_2$PO$_4$, pH 7) resulting in a solution of ca. pH 5. The resin was filtered off, washed with water, DMF, THF, and CH$_2$Cl$_2$ and analyzed. HPLC: r.t.=25.6 min. MALDI-MS: Calc. (M=$C_{19}H_{26}N_4O_5$): 390.44. Found (MNa$^+$, MH$_2$ONa$^+$): 413.3, 431.4 m/z.

EXAMPLE 16

Reaction of Aldehyde-Resin with Phenyl Lithium

The SPOCC-resin of Example 15 (30 mg, 0.011 mmol) was treated with a solution phenyllithium (7 eq. in 1 mL THF, 10 min at 0° C., followed by 1.5 h at room temperature. Analysis of the reaction afforded a mixture of several product in the range between 24 and 37 min of the HPLC. Products in the range between 24 and 27 min displayed the mass of the starting material. Products in the range between 31 and 37 min displayed the mass of dimers of the starting material. MALDI-MS: Calc. (2×M): 780.88). Found: ((2× M)Na$^+$): 804 m/z. No side-reactions were observed involving the resin itself.

EXAMPLE 17 p-[-(N-acryl-L-phenylalanyl-L-leucyl-glycylamido)-2,4-dimethoxy benzyl]-phenoxyacetylamido-SPOCC Methyl triphenylphosphonium iodide (69 mg, 0.171 mmol) was suspended in THF (2 mL) and cooled to −50° C. Butyl lithium (0.154 mmol) was added. The salt dissolved and the color of the solution changed to a strong yellow-orange. After 20 min the solution was warmed to −10° C. Resin from Example 15 (96 mg, 0.034 mmol) was added under argon to the stirred solution and reacted for 2 h. Preparative cleavage of the product (95% TFA, 2 h) afforded a mixture of 2- and 3-hydroxypropionyl compounds. They were obtained through the hydration of the acrylamidic Wittig reaction product.

EXAMPLE 18

N-(4-Carboxyl-but-2-trans-en-oyl)-(L)-leucyl-(L)-leucyl-glycyl-SPOCC-resin

Lyophilized resin from Example 15 (90 mg, 0.041 mmol) was treated with toluene (1 mL) and triethylorthoformate 10.5 mL) for two h and was washed with dry toluene (6x). Triethylphosphonoacetate (41 l, 5 eq.) was dissolved in toluene (1 mL). At 0° C. butyllithium (4.5 eq.) was added. After 10 min the solution was added to the resin and reacted at ambient temperature for 90 min. After washing (DMF, THF, CH$_2$Cl$_2$) and drying the resulting resin was analyzed with MAS-solid phase NMR in CDCl$_3$. Cleavage of an analytical sample and HPLC-analysis was conducted. One portion of the resin (45 mg) was cleaved and isolated by preparative HPLC yielding the title product (5.2 mg, 64%). r.t.=28.0 min. $^1$H-NMR, 250 MHz, D$_4$-MeOD):=0.88–0.98 (m, 12H, Leu-Me), 1.6–1.75 (m, 6H, Leu), 3.8–4.0 (2d, 2H, $^2$J 17.8 Hz, Gly-), 4.4–4.5 (m, 2H, Leu 6.68, 7.06 (2 d, 2H, $^3J_{trans}$=15.5 Hz, olefinic protons). $^{13}$C-NMR, 60 MHz, D$_4$-MeOD):=131.9, 137.3 (olefinic carbons). ES-MS: Calc.: M ($C_{18}H_{29}N_3O_7$)=399.20. Found: 400.2 m/z.

The usefulness of the polymers for peptide and glycopeptide synthesis are illustrated in the following examples.

EXAMPLE 19

N-(9-Fluorenyl-methoxycarbonyl)-L-alanyl-L-seryl-L-phenylalanyl-L-leucyl-glycyl-SPOCC-resin SPOCC-400 (326 mg, 0.58 mmol/g loading, 0.19 mmol) from Example 4 was reacted twice with a solution of Fmoc-Gly-OH (339 mg, 3 eq.), MSNT (338 mg, 3 eq.), and N-methylimidazole (MeIm) (68 l, 2.25 eq.) in CH$_2$Cl$_2$ (4 ml) each time for 45 min. After Fmoc-deprotection (20% piperidine in DMF, 2 and 16 min) the glycinyl-residue was elongated with four Fmoc-amino acids (3 eq. of Fmoc-Leu-OH, Fmoc-Phe-OH, Fmoc-Ser-OH, and Fmoc-Ala-OH) which were activated with TBTU (2.9 eq., 177 mg) and NEM (4 eq., 127 l). All acylation reactions were performed after 15 min of mixing time for the reagents in DMF (4 mL), a reaction time on the resin of 3 h, and followed by Fmoc-protection. After final Fmoc-deprotection the resin was analyzed with HPLC and MALDI-MS.

EXAMPLE 20

N-(9-Fluorenyl-methoxycarbonyl)-L-alanyl-O-(2,3,4,6-tetra-O-acetyl- -D-galactopyranosyl)-L-seryl-L-phenylalanyl-L-leucyl-glycyl-SPOCC-resin Resin from Example 19 (100 mg, 0.04 mmol) was lyophilized from dry toluene (3 mL) in a speed vac over night. Tetra-O-acetyl- -D-galactopyranosyl trichloroacetimidate (0.12 mmol, 3 eqv.) was dissolved in CH$_2$Cl$_2$ (1.5 mL) and added to the resin. Under argon trimethylsilyl trifluoromethanesulfonate (TMSOTf) (120 L of a 1 M solution in CH$_2$Cl$_2$) is added and reacted for one hour. The resin is then filtered off, washed with CH$_2$Cl$_2$, THF, DMF, THF, and CH$_2$Cl$_2$, and dried in vacuo. The glycosylation procedure was repeated. Analysis is conducted with HPLC and MALDI-MS after cleavage with NaOMe in MeOH (0.02 M, 2 h). Complete glycosylation had been achieved. HPLC: r.t.=20.1 min. MALDI-MS: Calc: M($C_{29}H_{45}N5O_{12}$): 655.7 Da. Found (MNa$^+$): 656 m/z.

EXAMPLE 21

L-Alanyl-O-(-D-galactopyranosyl)-L-seryl-L-phenylalanyl-L-leucyl-glycinehydrazid Resin from Example 20 (2 mg, 0.035 mmol) is treated for 2 h with 20% hydrazine in water. HPLC: r.t.=22.0 min. MALDI-MS: Calc.: M($C_{29}H_{47}N_7O_{11}$): 669.7 Da. Found (MNa$^+$): 694 m/z.

The usefulness of the resins for enzyme reactions are illustrated in the following examples.

EXAMPLE 22

L-Alanyl-(3-nitro)-L-tyrosinyl-L-glycyl-L-prolinyl-L-leucyl-glycyl-L-leucyl-L-tyrosinyl-alanyl-arginyl-(N$^c$-2-aminobenzoyl)-L-lysinyl-glycyl-glycyl-SPOCC-resin SPOCC-1500 from Example 3 (65 mg, 0.027 mmol) was treated twice with a solution of Fmoc-Gly-OH (41 mg, 5 eq.), MSNT (40 mg, 5 eq.), and MeIm (8 L, 3.75 eq.) in CH$_2$Cl$_2$ (4 mL) for 45 min. The resin was filtered off and washed with CH$_2$Cl$_2$ and DMF. The Fmoc-group was cleaved (20% piperidine in DMF, 2 and 16 min) and it was again washed with DMF. The fully protected nonapeptide of the sequence Fmoc-A(NO$_2$)YGPLGL('Bu)YA(Pmc)R(Boc-Abz)KG-OH (43 mg, 3 eq.) was dissolved in DMF (4 mL) together with TBTU (6.8 mg, 2.9 eq.) and NEM (3.7 L, 4 eq.). After 15 min the latter solution was added to the resin and reacted for 3 h. The resin was extensively washed with DMF and treated twice with 95% TFA (10 min, 2.5 h) to remove side chain protecting groups. Subsequently the resin was washed with 95% acetic acid (4 times 5 min), 5% triethylamine in DMF (three times 2 min), DMF (twice 2 min), THF, and CH$_2$Cl$_2$, followed by drying in vacuo. The peptide was cleaved off the resin with 0.1M NaOH for 2 h for analysis. HPLC: r.t.=32.0 min. MALDI-MS: Calc. M($C_{68}H_{99}N_{19}O_{19}$)=1486.7 Da. Found. (MH$^+$, MNa$^+$—H$_2$O) 1487, 1493 m/z.

EXAMPLE 23

Enzymatic Cleavage of Decapeptide Bound to SPOCC-Resin from Example 22. I.

Subtilisin: The resin (2 mg) was treated with a solution of subtilisin (10$^{-7}$ M) in pH 7 phosphate buffer (50 mmol NaH$_2$PO$_4$ in H$_2$O). After 15 min strong fluorescence under a UV-irradiation was observed. After three h the resin was washed (water, DMF, THF, CH$_2$Cl$_2$) and dried. One portion of the enzyme-treated resin (1 mg) was treated with NaOH (50 L of a 0.1 M solution, 2 h) and the product analyzed by HPLC followed by mass spectrometry. The other portion of the resin (1 mg) was subjected to Edman degradation. The HPLC indicated complete cleavage of the starting peptide substrate. HPLC: r.t.=22.0 min. MALDI-MS: Calc. M($C_{26}H_{42}N_{10}O_7$)=606.7 Da. Found: 617.6 m/z. Edman-degradation (3 cycles): A, Abz-; R—; K-.

II. Matrix-metalloprotease-9: The resin (2 mg) was treated with a solution of MMP-9 (100 nM and 275 nM) in pH 7.72 buffer (buffer 17, obtained from CCBR, Ballerup) for 24 h. In both cases no significant fluorescence was observed. Cleavage and HPLC-analysis as described under I. yielded exclusively the starting peptide substrate.

EXAMPLE 24

L-Alanyl-(3-nitro)-L-tyrosinyl-L-glycyl-L-prolinyl-L-leucyl-glycyl-L-leucyl-L-tyrosinyl-alanyl-arginyl-(N$^c$-2-aminobenzoyl)-L-lysinyl-glycyl-glycyl-POEPS3-resin The resin obtained in Example 8 from mono- and bis-vinylphenylpropyl-PEG(1500) (0.1 g, 0.02 mmol) was packed in a manual syringe synthesizer connected to a vacuum manifold and was esterified with Fmoc-Gly-OH using the MSNT procedure (Tetrahedron Letters 1988, 29, 5871–5874). The Fmoc group was removed with 20% piperidine in DMF and the protected substrate Fmoc-AY (NO$_2$)GPLGLY(tBu)R(Pmc)K(Boc-Abz)G-OH (45 mg, 1 eqv.) was coupled to the resin using in situ activation with TBTU (1 eqv.) and NEM (1 eqv.). The resin was washed with DMF and dichloromethane and dried and protecting groups were removed during 2 h with 95% aq TFA. The resin was washed with dichloromethane and dried. The contents of amino acids were determined by quantitative amino acid analysis and Edman degradation sequence analysis and the expected sequence and amount was found. The peptide was cleaved off the resin with 0.1M NaOH for 2 h for analysis. HPLC: r.t.=32.0 min. MALDI-MS: Calc. M($C_{68}H_{99}N_{19}O_{19}$)=1486.7 Da. Found: (MH$^+$, Mna$^+$—H$_2$O) 1487 m/z.

A beaded polymer from the oxetanylated macromonomer in Example

EXAMPLE 25

Enzymatic cleavage of decapeptide bound to POEPS3-resin from Example 24. The resin from Example 24 (10 mg) was suspended in aqueous 50 mM bicine buffer (0.2 mM CaCl$_2$, pH 8.5, 100 µL) and 10$^{-6}$ M subtilisin Carlsberg (10 µL) in the same buffer was added. The reaction was followed visually under a fluorescence microscope (ex 320 nm; em 420–500 nm) and the reaction was complete in 60 min. Edman sequence analysis of the residual peptide on the resin showed the cleavage to be complete. The result was confirmed by cleavage with 0.1 M NaOH and HPLC analysis.

A similar experiment with the much larger MMP9 showed little cleavage only at the resin surface indicating the importance of matching the length of the PEG used for the resin preparation with the size of the enzyme to be investigated. Cleavage with 0.1 M NaOH and HPLC analysis as in Example 23 showed only non cleaved peptide.

EXAMPLE 26

Synthesis of Silicon Polymeric Surfactant: Methacryloyl PEG 350 Monomethylether.

Methacryloylchloride (0.67 ml, 5.9 mmol) was added dropwise to a solution of PEG 350 monomethylether (2.0 g, 5.7 mmol) and triethylamine (1.7 ml, 12.2 mmol) at 0° C. with stirring and exclusion of moisture. The reaction was stirred for 5 h. The reaction mixture was filtered and the solvent was evaporated in vacuo. The resulting pale white/yellow oil was used without further treatment. Methacryloxypropylpentamethyldisiloxane (4.0 ml, 13.1 mmol) and methacryloyl PEG 350 monomethylether were dissolved in degassed chloroform (10 ml). AIBN (60 mg, 0.37 mmol) was added and the reaction vial was sealed and polymerised at 60° C. for 48 h. The solvent was removed by evaporation in vacuo. The resulting polymer was a yellow paste and was dried under high vacuum and used without further treatment.

EXAMPLE 27

Suspension Polymerisation of Beaded Oxetan Derived Polymer by Procedure A (SPOCC Resin)

The surfactant (25 mg/g macromonomer) was dissolved in dichloroethane (0.38 ml 1 g macromonomer) and mixed with the macromonomer (4 g) under argon. After a homogeneous solution was obtained the solution was cooled in an ice bath and $BF_3 \cdot OEt_2$ (0.1 ml/g macromonomer) was added with stirring and exclusion of moisture. After 2 min the mixture was added to silicon oil (20 ml/g macromonomer) at rt. stirring at 150 rpm. After 2 h at rt. the temperature was increased to 60° C. and the polymerisation was left over night without stirring. The resulting polymer particles were filtered on a sintered glass funnel. The beads were washed with dichloromethane, dimethyl formamide, methanol and water. The beads were treated with 6M HCl for 2 h at rt. and washed extensively with water, methanol, dimethyl formamide and dichloromethane. The beads were dried and sorted. Bead distribution (measured in methanol); X>1000 μm:X>500 μm:X>300 μm:X<300 μm (3:20:5:1). Total yield of beds: 2.9 g, 73%

EXAMPLE 28

Suspension Polymerisation of Beaded Oxetan Derived Polymer by Procedure B (SPOCC Resin Prepared with Addition of 3-methyl oxetan-yl methanol)

The surfactant (25 mg/g macromonomer) was dissolved in dichloroethane (0.38 ml/g macromonomer) and mixed with the macromonomer (prepared from PEG 1500, 2.3 g) and 3-methyl-3-oxetanemethanol (27 μL–100 μL) under argon. After a homogeneous solution was obtained the solution was cooled in an ice bath and $BF_3 \cdot OEt_2$ (0.1 ml/g macromonomer) was added with stirring and exclusion of moisture. After 45 see the mixture was added to silicon oil (20 ml/g macromonomer) at rt. stirring at 200 rpm. After 2 h at rt. the temperature was increased to 60° C. and the polymerisation was left over night without stirring. The resulting polymer particles were filtered on a sintered glass funnel. The beads were washed with dichloromethane, dimethyl formamide, methanol and water. The beads were treated with 6M HCl for 2 h at rt. and washed extensively with water, methanol, dimethyl formamide and dichloromethane. The beads were dried and sorted. Bead distribution (measured in methanol); X>1000 μm:X>500 μm:X>300 μm:X<300 μm (6:17:7:0) Total yield of beds: 1.7 g, 74%

EXAMPLE 29

(bis-(3-methyl-3-oxetanylmethoxy)-2-buten. 1,4-trans but-2-en diol (11 mmol) was dissolved in toluene and DMF (each 15 mL). Under stirring potassium hexamethyldisilazan (KHMDS) (22 mmol) was added at room temperature, after 15 min the solvents were removed together with HMDS at 50° C. waterbath with the rotary evaporator. The remaining potassiated alcohol was redissolved in DMF (15 mL). The mesylated oxetane derivative (24 mmol) was added in portions at room temperature and the reaction was heated for 12 hrs to 75° C. After cooling to ambient temperature water (2 mL) was added and stirred for 15 min in order to fully hydrolyze unreacted alkylating agent. The solvents were removed at 40° C. under reduced pressure. The remanens was disolved in $CH_2Cl_2$ and extraxted with water. The organic phase was dried and evaporated. Yield: 90% of the title compound. The NMR of the product indicated the alkylation was quantitative.

EXAMPLE 30

SPOCC-Resin formed by polymerization of oxetanylated PEG and a short temporary crosslinker. Oxetanylated PEG-1500 (1 to 20 mmol) prepared as in Example 2 and the crosslinker prepared in Example 29 (5–50 mol %) was dissolved under argon in an equal volume of $CH_2Cl_2$, cooled to −20° C., and stirred with a magnetic stirring bar. Boron trifluoride diethyletherate (0.15 to 0.5 equiv.) was added and the solution stirred at −10 then allowed to varm to room temperature where the polymer formed. After 2 h the temperature was increased to 60° C. overnight. The polymer was cut into pieces. These were swollen ($CH_2Cl_2$, 2 h) and then granulated through a metal sieve (1 mm pore size) employing a pestle. The granulated resin was washed carefully ($CH_2Cl_2$, THF, DMF, water, DMF, THF, $CH_2Cl_2$) and dried in vacuo. Loading was comparable with that of the polymer prepared in Example 4. The swelling capacity of the polymer product was considerably less than that of the polymer described in Example 4 depending of the amount of crosslinker added.

The invention claimed is:

1. A macromonomer having the structure:

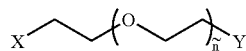

where ñ is a real number of 6–300,
and where X and Y each independently is a group of the formula

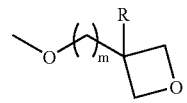

where m is an integer of 1–10, and R is H or alkyl or aryl or arylalkyl,
or where X is —OH, and Y is a group of the formula

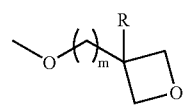

where m is an integer of 1–10, and R is H or alkyl or aryl or arylalkyl.

2. A macromonomer having the structure:

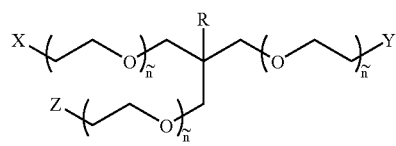

where R is H or alkyl or aryl or arylalkyl,
and ñ is a real number of 6–300 as defined above
and where X, Y and Z each independently is OH or a group of the formula

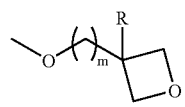

where m is an integer of 1–10, a is as defined above, and R is H or alkyl or aryl or arylalkyl;

provided that at least one of X, Y or Z is a group of the formula

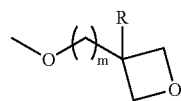

where m is an integer of 1–10, a is as defined above, and R is H or alkyl or aryl or arylalkyl.

3. The macromonomer of claim 1 which is terminated by a 3-methyloxetan-3-ylmethyl ether group and has the formula:

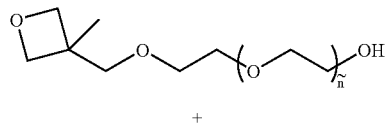

+

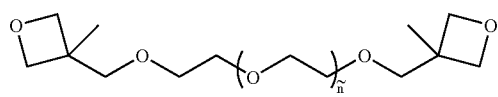

where ñ=6–300.

4. A macromonomer of claim 1 which is terminated by an 3-methyloxetan-3-ylmethyl ether group and has the formula

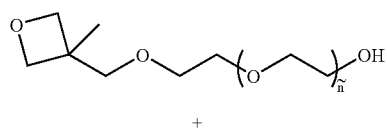

+

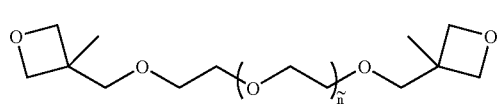

where ñ=6–300 and wherein the macromonomer
has been acetylated or in other ways temporarily hydroxyl-protected on free hydroxyl groups.

5. A process for the preparation of the macromonomer of claim 1 comprising reacting an alkali metal derivative of a polyethylene glycol having 6–300 repeating units with a halo substituted compound having the formula:

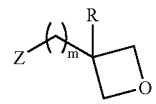

where Z is Cl, Br, I, toluenesulfonyloxy or $CF_3SO_3$ and where m is an integer of 1–10, and R is H or alkyl or aryl or arylalkyl.

6. A process for the preparation of the macromonomer of claim 2 comprising reacting an alkali metal derivative of a polyethylene glycol having the formula:—

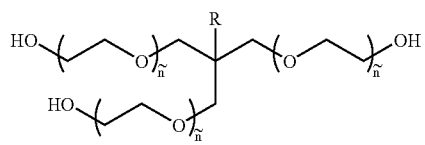

where R is H or alkyl or aryl or arylalkyl and ñ is 6–300 with a halo substituted compound having the formula:

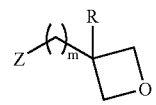

where Z is Cl, Br, I, toluenesulfonyloxy or $CF_3SO_3$ and where m is 1–10 and R is H or alkyl or aryl or arylalkyl.

7. A process according to claims 5 or 2 wherein the alkali metal derivative is a sodium derivative.

8. A process according to claims 5 or 2 wherein the alkali metal derivative is a potassium derivative.

9. A cross linked polymer formed by the polymerization of a macromonomer of claim 1.

10. A cross linked polymer formed by the polymerization of a macromonomer of claim 3 wherein the structure of the polymer is:

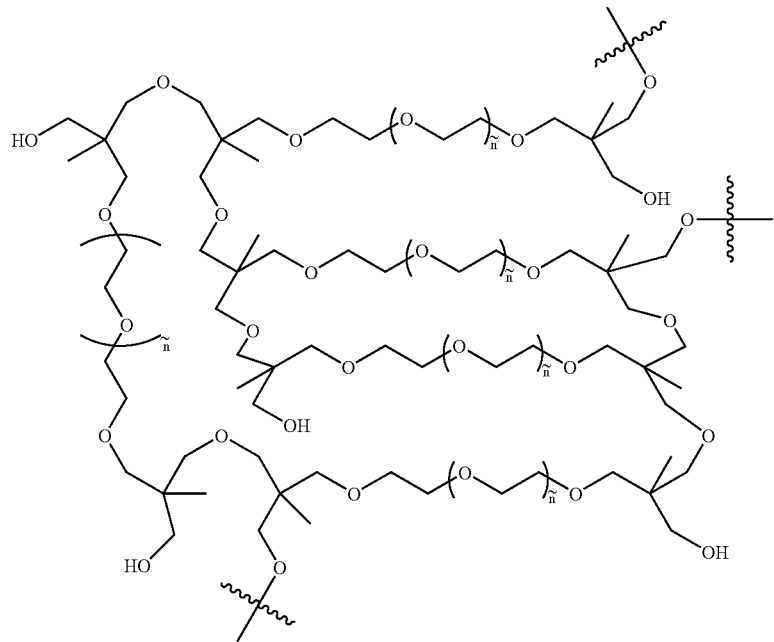
where ñ=6–300.
11. A cross linked polymer formed by the polymerization of the macromonomer of claim 4 wherein the per-O-acetylated or in other ways temporarily hydroxyl-protected polymer structure is an analog of the hydroxylated structure:
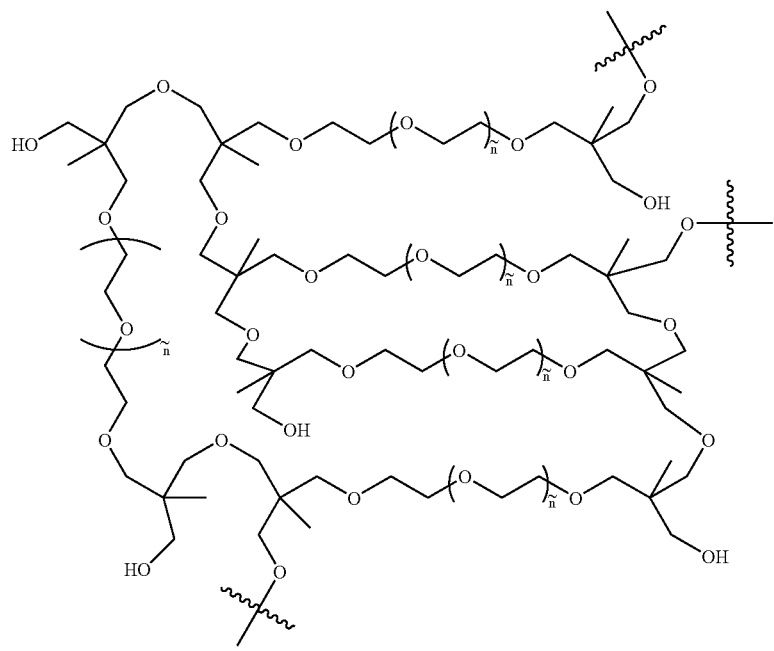
where ñ=6–300.
12. A cross linked polymer formed by the bulk polymerization of a macromonomer of claim 2.

13. A beaded polymer, comprising the cross linked polymer of claim 9, claim 10 or claim 11 wherein the beaded polymer is formed by suspension polymerization in silicon oil.

14. The beaded polymer of claim 13 where the beads are stabilized by a surfactant.

15. The beaded polymer of claim 14 where the surfactant is obtained by radical polymerization of a mixture of acryloylated PEG-OMe and acryloyl propyl pentamethyl disiloxane.

16. The polymer of claim 9, further comprising a short temporary crosslinker which can be selectively cleaved to result in expansion of the resin.

17. The polymer of claim 16 where the short crosslinker has the structure

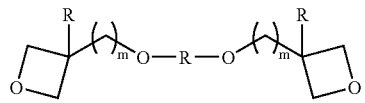

where R is a alkyliden, aryliden, silane, siloxane thioether or ether bridge chemically susceptible to selective cleavage conditions.